(12) United States Patent
Chung et al.

(10) Patent No.: US 9,547,201 B2
(45) Date of Patent: Jan. 17, 2017

(54) DISPLAY APPARATUS

(71) Applicant: InnoLux Corporation, Miao-Li County (TW)

(72) Inventors: Chao-Chun Chung, Miao-Li County (TW); Chih-Yung Hsieh, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 144 days.

(21) Appl. No.: 14/452,919

(22) Filed: Aug. 6, 2014

(65) Prior Publication Data

US 2015/0055042 A1 Feb. 26, 2015

Related U.S. Application Data

(60) Provisional application No. 61/869,320, filed on Aug. 23, 2013.

(30) Foreign Application Priority Data

Nov. 26, 2013 (TW) .............................. 102143021 A

(51) Int. Cl.
*G02F 1/1343* (2006.01)
*G02F 1/1333* (2006.01)
*G02F 1/1335* (2006.01)

(52) U.S. Cl.
CPC ... *G02F 1/134309* (2013.01); *G02F 1/133305* (2013.01); *G02F 1/133512* (2013.01); *G02F 1/133514* (2013.01); *G02F 1/134336* (2013.01)

(58) Field of Classification Search
CPC .............. G02F 1/1333; G02F 1/133514; G02F 1/133305;G02F 1/133512; G02F 1/134309

See application file for complete search history.

(56) References Cited

U.S. PATENT DOCUMENTS

| | | | |
|---|---|---|---|
| 2011/0234949 A1* | 9/2011 | Matsui .............. | G02F 1/133514 349/106 |
| 2014/0092356 A1* | 4/2014 | Ahn ...................... | G02F 1/1339 349/153 |
| 2015/0029449 A1* | 1/2015 | Woo .................. | G02F 1/133512 349/110 |

FOREIGN PATENT DOCUMENTS

| | | |
|---|---|---|
| CN | 11317109 A | 12/2008 |
| CN | 101344651 A | 1/2009 |
| CN | 101681060 A | 3/2010 |
| DE | 202013100638 U1 | 3/2013 |
| JP | 2009229667 A | 10/2009 |
| TW | M251239 U | 11/2004 |

\* cited by examiner

*Primary Examiner* — Dung Nguyen

(74) *Attorney, Agent, or Firm* — Muncy, Geissler, Olds & Lowe, P.C.

(57) ABSTRACT

A display apparatus includes a first substrate and a color filter layer. The first substrate has a curved first side and a display area. The first side has at least a curvature radius and the range of the curvature radius is between 500 mm and 10000 mm. At least a datum line is defined in the display area. The color filter layer is disposed on the first substrate and includes a plurality of filter portions. The filter portions are disposed within the display area. An included angle between the datum line and the first side is between 0° and 10°, and the filter portions located corresponding to the datum line have the same color.

6 Claims, 8 Drawing Sheets

DISPLAY APPARATUS

CROSS REFERENCE TO RELATED APPLICATIONS

The non-provisional patent application claims priority to U.S. provisional patent application Ser. No. 61/869,320 filed on Aug. 23, 2013 and under 35 U.S.C. §119(a) on Patent Application No(s). 102143021 filed in Taiwan, Republic of China on Nov. 26, 2013. This and all other extrinsic materials discussed herein are incorporated by reference in their entirety.

BACKGROUND OF THE INVENTION

Field of Invention

The invention relates to a display apparatus and, in particular, to a display apparatus having a curved panel.

Related Art

Flat display apparatuses, such as LCD apparatuses or OLED apparatuses, have advantages such as low power consumption, less heat generation, light weight and non-radiation, and are therefore widely applied to various electronic products and gradually take the place of cathode ray tube (CRT) display apparatuses.

A conventional LCD apparatus mainly includes an LCD panel and a backlight module disposed opposite to the LCD panel. The LCD panel has a plurality of pixels disposed in an array. The backlight module emits the light passing through the LCD panel, and the pixels of the LCD panel can display images accordingly.

For fitting various demands of users and providing a better display quality for users, innovative display apparatuses are always developed by the industry. Therefore, it is an important subject to provide an innovative curved display apparatus to provide a better display quality for users and satisfy various demands of users.

SUMMARY OF THE INVENTION

An objective of the invention is to provide a display apparatus having a curved panel to provide better display quality for users according to the demands of users.

To achieve the above objective, a display apparatus according to the invention comprises a first substrate and a color filter layer. The first substrate includes a curved first side and a display area. The first side has at least a curvature radius and the range of the curvature radius is between 500 mm and 10000 mm, at least one datum line is defined in the display area, and the datum line and the first side have an included angle between 0° and 10°. The color filter layer is disposed on the first substrate and includes a plurality of filter portions disposed within the display area. The filter portions located corresponding to the datum line have the same color.

In one embodiment, the curvature radius is further between 2000 mm and 7500 mm.

In one embodiment, the included angle is further between 0° and 5°.

In one embodiment, the display apparatus further comprises a second substrate and a liquid crystal layer. The second substrate is disposed opposite to the first substrate, and the liquid crystal layer is disposed between the first substrate and the second substrate.

In one embodiment, the display apparatus further comprises a second substrate, which is disposed opposite to the first substrate and includes a plurality of thin-film transistor (TFT) devices and a plurality of pixel electrodes.

In one embodiment, the first substrate further includes a black matrix layer including a plurality of light-blocking segments, and at least one of the light-blocking segments is disposed between the two adjacent filter portions.

In one embodiment, the pixel electrodes include a first pixel electrode. In a side view of the first substrate perpendicular to the first side, the first pixel electrode has a pixel width, a shortest offset distance is formed between the center line of the light-blocking segment that is the closest to the first pixel electrode and an edge of the first pixel electrode, and the offset distance is 0~0.5 times the pixel width.

In one embodiment, the offset distance farther from the center of the first substrate is greater than the offset distance nearer the center of the first substrate.

In one embodiment, the first substrate further includes a third side, which is disposed adjacent to the first side and has a curvature radius less than the infinity and greater than or equal to the curvature radius of the first side.

As mentioned above, in the display apparatus of the invention, the first substrate includes a curved first side and a display area, the first side has at least a curvature radius between 500 mm and 10000 mm, and a datum line is defined in the display area. Besides, the color filter layer is disposed on the first substrate and includes a plurality of filter portions disposed within the display area. The datum line and the first side have an included angle between 0° and 10°, and the filter portions located on the datum line have the same color. Thereby, the filter portions with the same color are arranged substantially in parallel to the curved first side of the first substrate, so when the light passes through the pixel, the display apparatus won't undergo the color mix problem and color distortion and can be thus provided with a better display quality.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
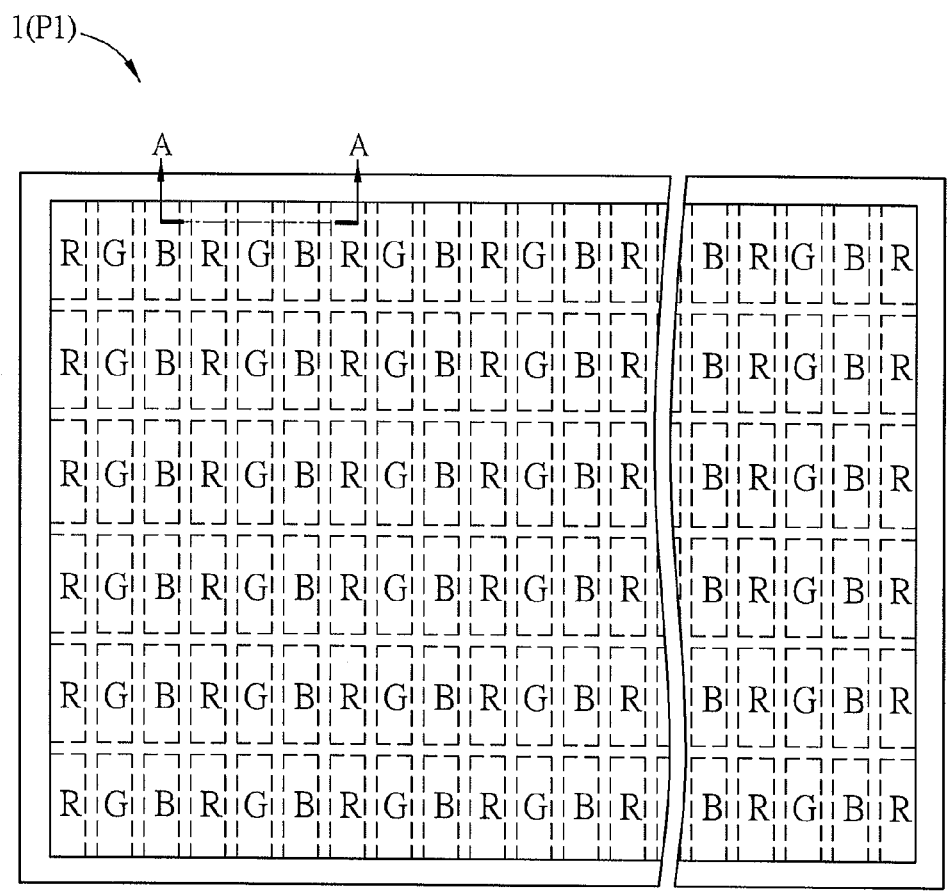
FIG. 1A is a schematic top-view diagram of a display apparatus.
Figure 1B:
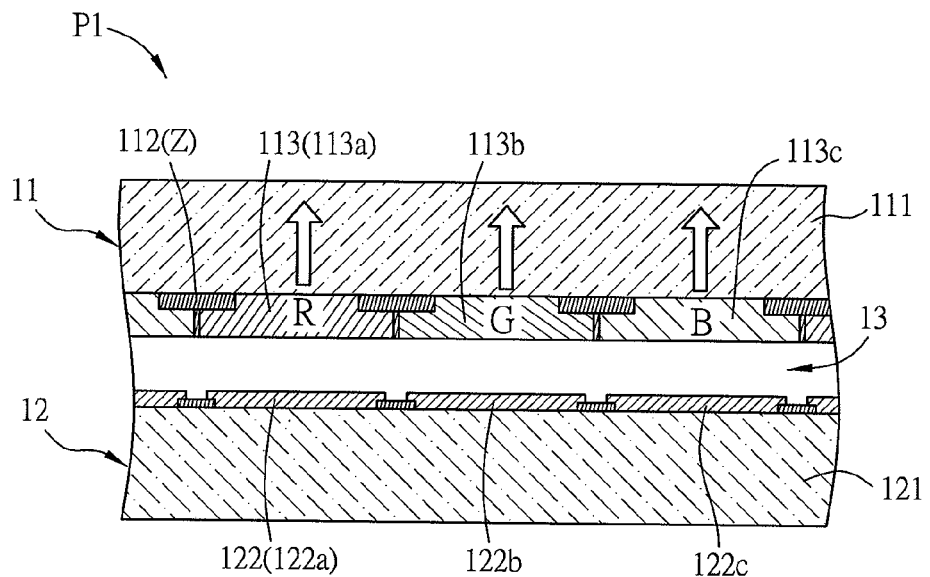
FIG. 1B is a schematic sectional diagram taken along the line A-A in FIG. 1A.

FIG. 1A is a schematic top-view diagram of a display apparatus 1, and FIG. 1B is a schematic sectional diagram taken along the line A-A in FIG. 1A.

As shown in FIGS. 1A and 1B, the display apparatus 1 includes a display panel P1. Herein for example, the display panel P1 is an LCD panel, so the display apparatus 1 can further include a backlight module (not shown) disposed opposite to the display panel P1. The backlight module can emit the light passing through the display panel P1 so that the display apparatus 1 can display images.

As shown in FIG. 1B, the display panel P1 includes a color filter (CF) substrate 11, a thin-film transistor (TFT) substrate 12 and a liquid crystal layer 13 disposed between the CF substrate 11 and the TFT substrate 12. The CF substrate 11, the TFT substrate 12 and the liquid crystal layer 13 can form a plurality of pixels disposed in an array. Herein, the CF substrate 11 includes a transparent substrate 111, a black matrix layer 112 and a color filter layer 113. The color filter layer 113 includes a plurality of filter portions, such as a red color filter portion 113a (R), a green color filter 113b (G) and a blue color filter portion 113c (B). The filter portions are disposed on the side of the transparent substrate 111 facing the TFT substrate 12. The black matrix layer 112 includes a plurality of light-blocking segments Z, and at least one of the light-blocking segments Z is disposed between the two adjacent filter portions.

The TFT substrate 12 includes a transparent substrate 121 and a pixel electrode layer 122. The pixel electrode layer 122 is disposed on the side of the transparent substrate 121 facing the CF substrate 11 and includes a plurality of pixel electrodes 122a, 122b, 122c. In each of the pixels, a pixel electrode is disposed corresponding to a filter portion (for example, the pixel electrode 122a disposed corresponding to the red color filter portion 113a, the pixel electrode 122b disposed corresponding to the green color filter portion 113b, the pixel electrode 122c disposed corresponding to the blue color filter portion 113c, . . . ). Accordingly, when the backlight module (not shown) emits the light passing through the display panel P1 and the LC molecules are controlled to rotate by the applied electric field, the pixels of the display apparatus 1 can display colors forming images.

Figure 1C:
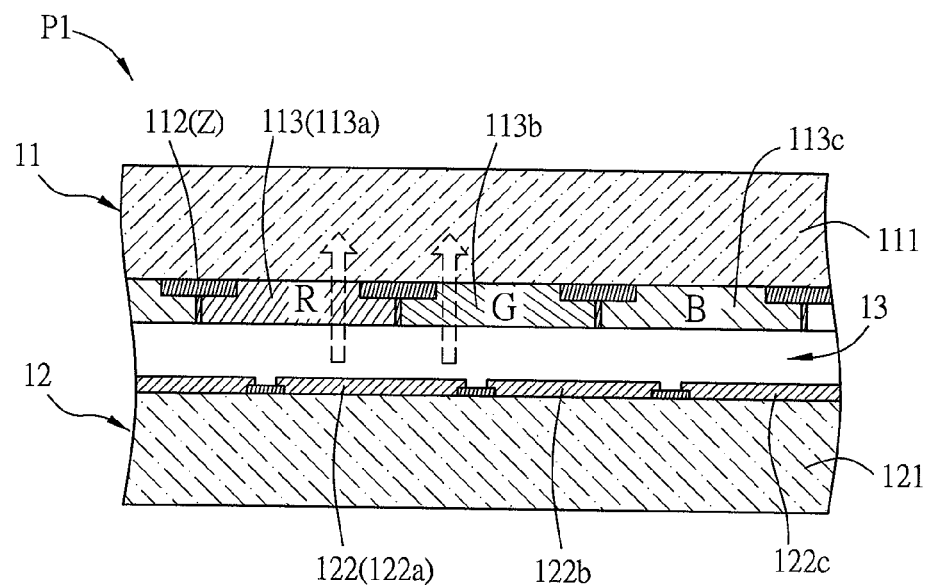
FIG. 1C is a schematic sectional diagram showing the misalignment between the CF substrate and the TFT substrate of a display apparatus.

However, when the display panel P1 is a curved panel, the overlarge curved angle of the curved panel will make the CF substrate 11 and the TFT substrate 12 a misalignment, and therefore a pixel electrode of the TFT substrate 12 may correspond to two filter portions of the color filter layer of the CF substrate 11 (for example, the pixel electrode 122a corresponding to the red color filter portion 113a and the adjacent green color filter portion 113b in FIG. 1C). Accordingly, when the backlight module emits the light passing through the pixel, the red color and green color will mix together and result in the color distortion. The color distortion will become the most serious on the two sides of the curved panel. Hence, when the display panel P1 is a curved panel, the color mix problem due to the curved angle needs to be noticed specially in order not to deteriorate the display quality of the display apparatus.

Figure 2A:
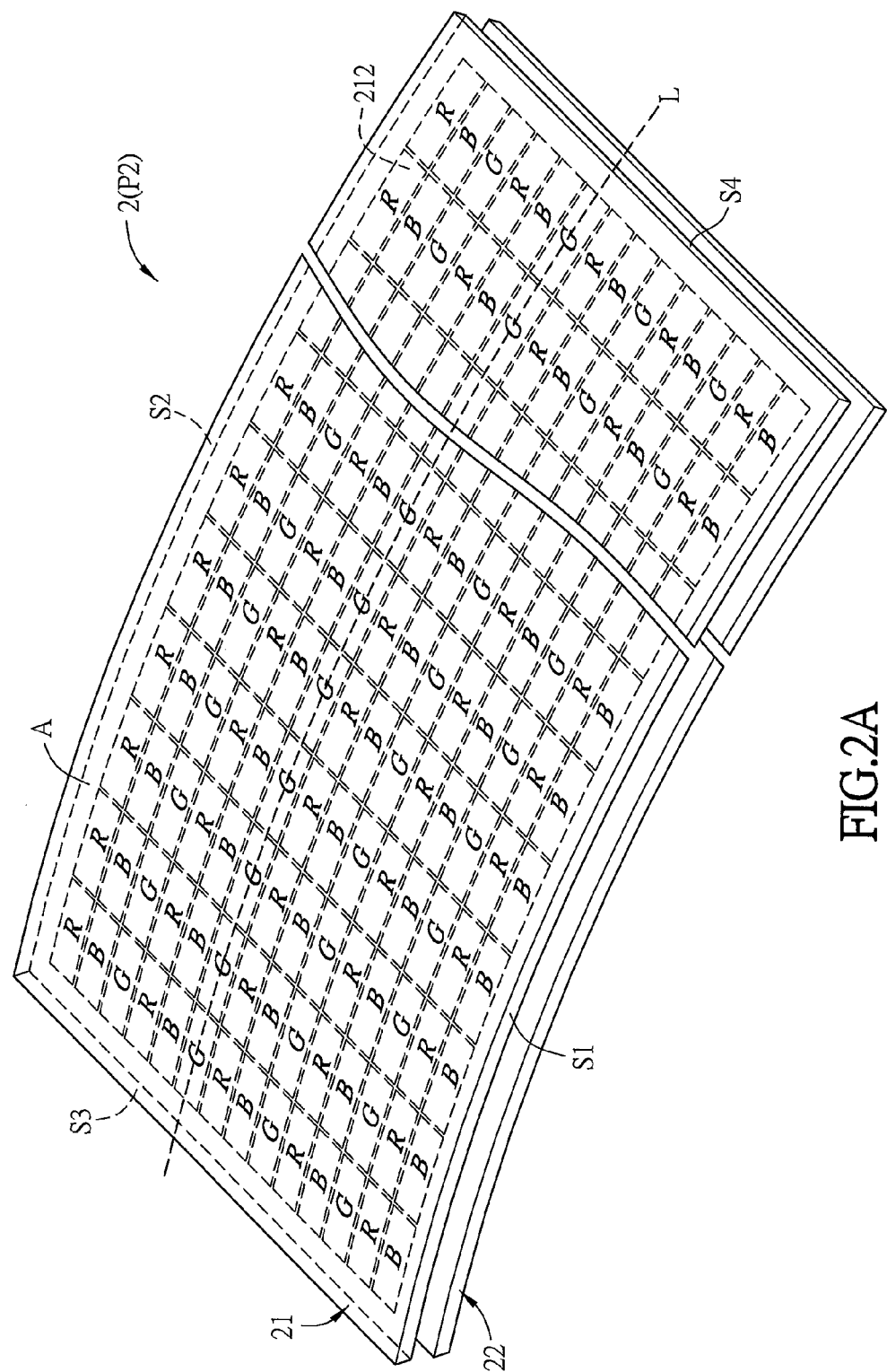
FIG. 2A is a schematic diagram of a display apparatus according to an embodiment of the invention.
Figure 2B:
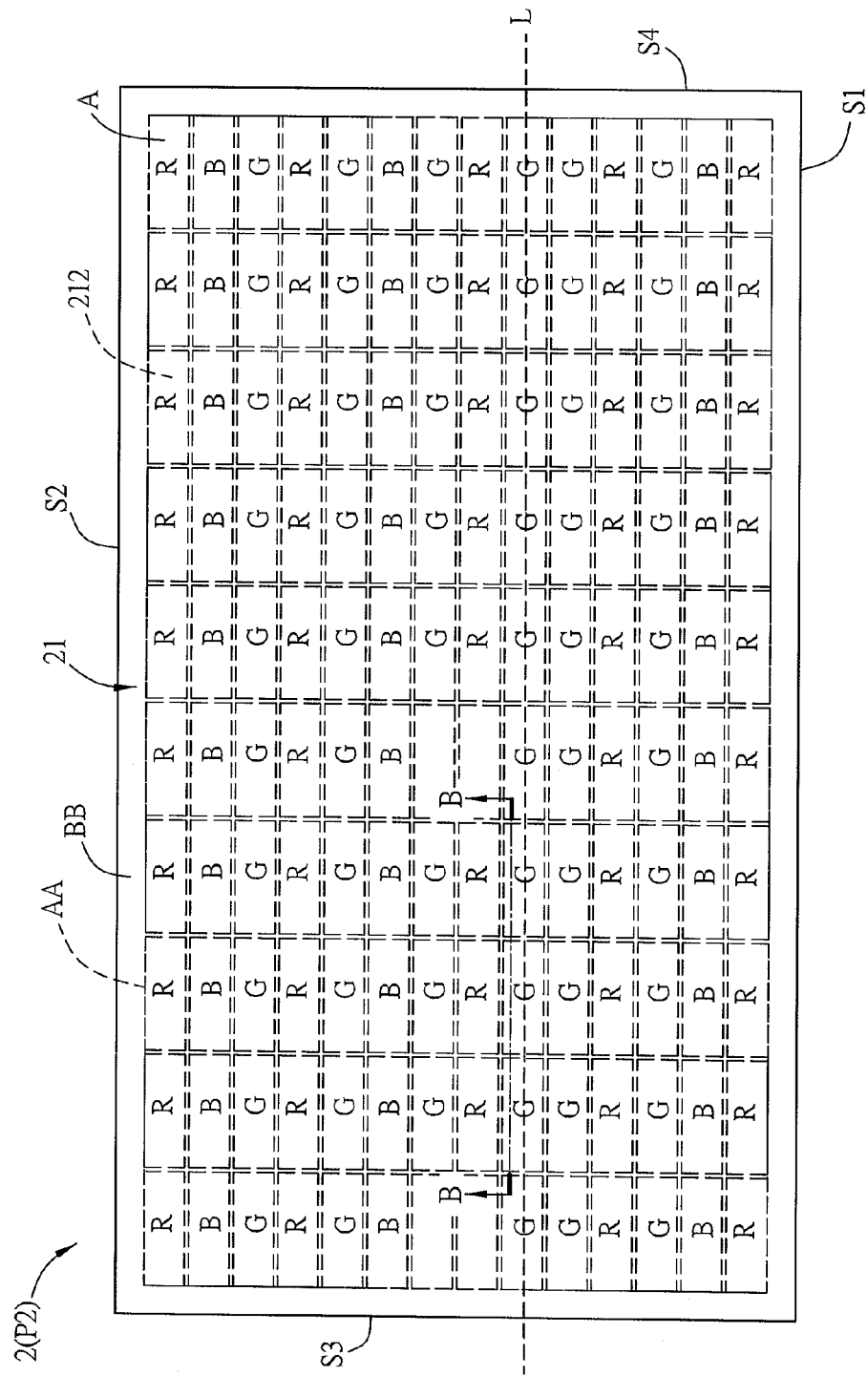
FIG. 2B is a schematic top view of the display apparatus in FIG. 2A.
Figure 2C:
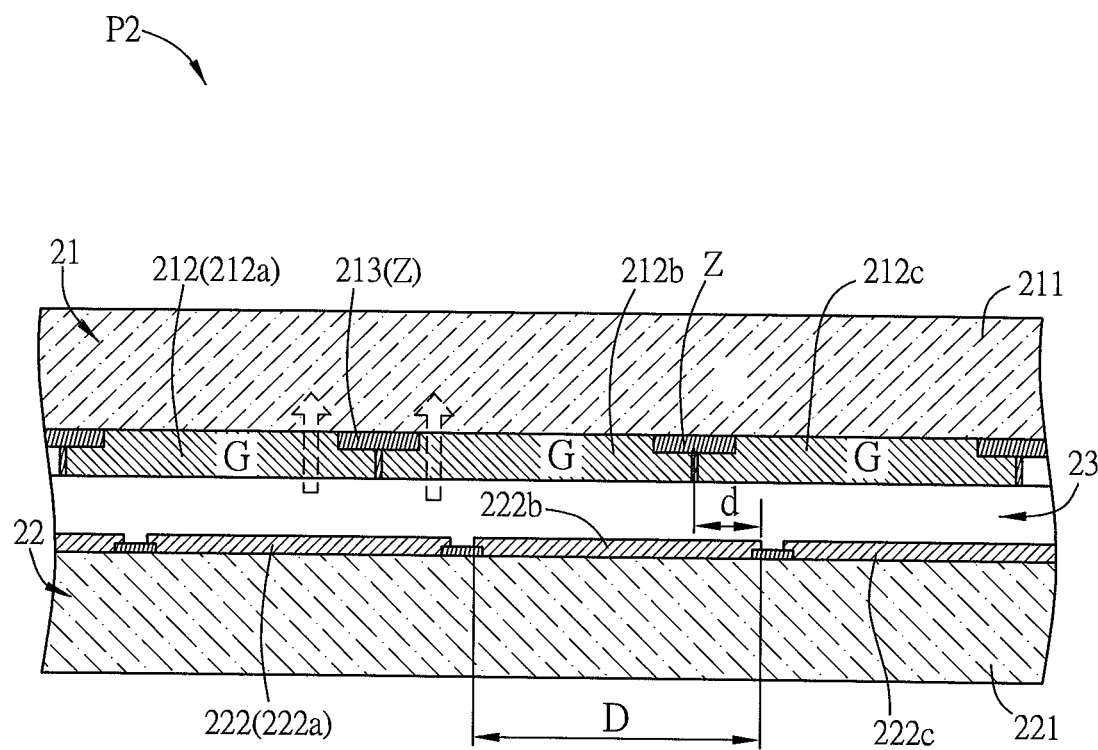
FIG. 2C is a schematic sectional diagram taken along the line B-B in FIG. 2B.
Figure 2D:
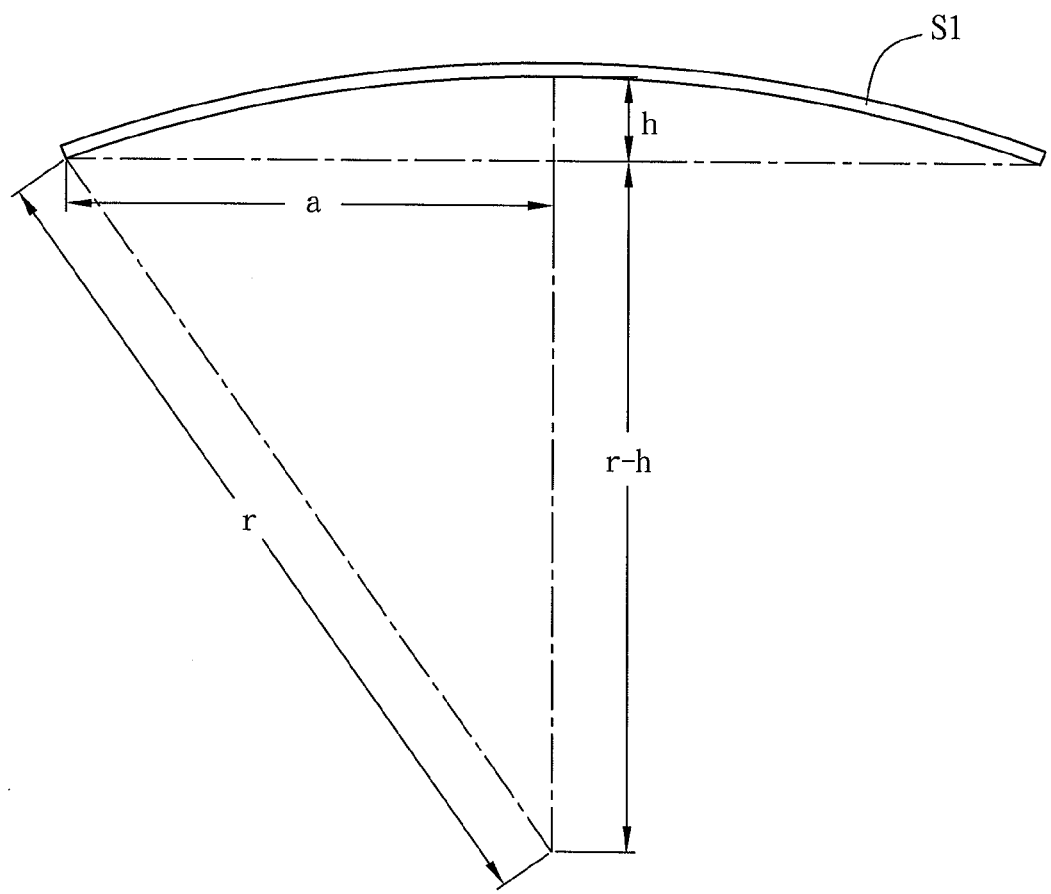
FIG. 2D is a schematic side view of a part of the first substrate in FIG. 2A.

Accordingly, FIG. 2A is a schematic diagram of a display apparatus 2 according to an embodiment of the invention, FIG. 2B is a schematic top view of the display apparatus 2 in FIG. 2A, FIG. 2C is a schematic sectional diagram taken along the line B-B in FIG. 2B, and FIG. 2D is a schematic side view of a part of the first substrate 21 in FIG. 2A.

As shown in FIGS. 2A to 2D, the display panel 2 can be an LCD apparatus or an OLED display apparatus. In this embodiment, the display apparatus 2 is an LCD apparatus for example and is a curved LCD apparatus. As shown in FIG. 2A, the "curved" structure indicates the display apparatus 2 includes a curved display panel P2 and the curved display panel P2 has a curved display surface A and the user can see the images of the display apparatus 2 through the display surface A. The display surface A can be a curved surface to have a curvature radius, or include a plurality of curved surfaces (like a wave) to have several curvature radiuses. In other words, in a side view of the display panel P2, the two sides of the display panel P2 are more curved or raised than the central portion, or the display surface A can have a wavy shape in other embodiments. However, the invention is not limited thereto. To be noted, the "curved" display panel P2 indicates that the display panel P2 has been curved by any proper manufacturing process before shipped out of the factory.

Figure 2E:
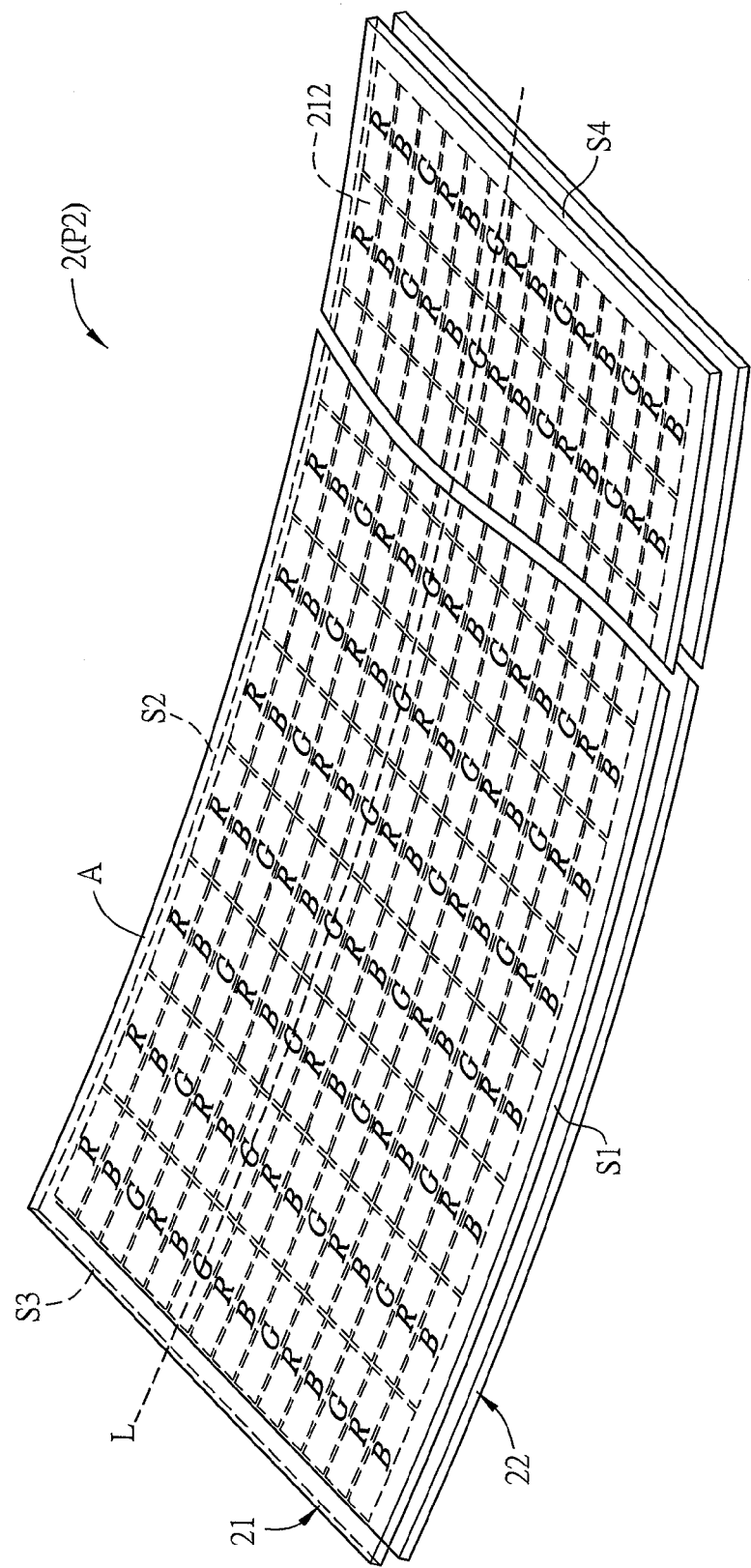
FIG. 2E is a schematic diagram of a display apparatus according to another embodiment of the invention.

As shown in FIG. 2A, in this embodiment, the two sides of the display panel P2 of the display apparatus 2 are curved away from the viewer, so that the two sides are farther from the front viewer than the central portion, and the display surface A is a curved surface for example. In other embodiments, as shown in FIG. 2E, the two sides of the display panel P2 can be curved towards the direction of the viewer, so that the central portion is farther from the front viewer than the two sides. Although the display panel P2 is a curved display panel as shown in FIG. 2A, it's still has a quadrilateral shape (a rectangle herein) as shown in FIG. 2B in a top view. FIGS. 2A and 2B just shows the arrangement of the red color filter portion R, the green color filter portion G and the blue color filter portion B of the color filter layer 212 of the display panel P2 without showing the other elements of the display apparatus 2.

As shown in FIG. 2A, the display panel P2 of this embodiment includes a first substrate 21, a second substrate 22 and a liquid crystal layer 23 (not shown in FIG. 2B). The first substrate 21 and the second substrate 22 are disposed oppositely, and the liquid crystal layer 23 is disposed between the first and second substrates 21 and 22. The first substrate 21 and the second substrate 22 are made by transparent material, and can be glass substrates, quartz substrates or plastic substrates. In this embodiment, each of the first substrate 21 and the second substrate 22 includes a glass substrate for example. Moreover, the display apparatus 2 can further include a backlight module (not shown). The backlight module can emit the light passing through the display panel P2, and the pixels of the display panel P2 can display colors to form images accordingly.

The first substrate 21 has a curved first side S1. In a side view of the first substrate 21 perpendicular to the first side S1 as FIG. 2D, the curved first side Si has at least a curvature radius r. In this embodiment, the curvature radius r is between 500 mm and 10000 mm. The curvature radius r is between 1500 mm and 8000 mm favorably and between 2000 mm and 7500 mm more favorably. Herein, the curvature radius r can be calculated by Pythagorean theorem. In FIG. 2D where just a part of the first substrate 21 is shown, the curvature radius r can be calculated by the formula: $r=(a^2+h^2)/2h$ and $0<a\leq 1$ cm. In this embodiment, the first side S1 of the first substrate 21 has a single curvature radius r for example (i.e. the curved display panel P2), but in other embodiments the first side S1 may have two or more curvature radiuses r.

As shown in FIG. 2B, on the display surface A of the display panel P2, a display area (active area) AA is defined to display images, and a non-display area (not displaying images and surrounding the display area AA) BB is defined outside the display area AA. At least one datum line L is defined in the display area AA, and herein for example, a single datum line L is defined in the display area AA. The datum line L is on the display surface A and can be a virtual straight line or curved line, or a real straight line or curved line. The datum line L is on the display surface and crosses the display area AA. However, the invention is not limited thereto.

As shown in FIG. 2C, the first substrate 21 includes a first transparent substrate 211 and a color filter layer 212. The color filter layer 212 includes a plurality of filter portions within the display area AA, and the filter portions can include red color filter portions R, green color filter portions G and blue color filter portions B disposed on the first transparent substrate 211 (color filter portions R and blue color filter portions B are not shown in FIG. 2C). The red color filter portions R, the green color filter portions G and the blue color filter portions B can be made by transparent material, such as pigments or dyes. Besides, the color filter portions R, G, B can be formed in an array on the side of the first transparent substrate 211 facing the second substrate 22 by stained method, pigment disperse method, print method, dry film method or electro-deposition method. Herein, the color filter layer 212 may include filter portions of other colors, such as cyan.

The first substrate 21 further includes a black matrix layer 213. The black matrix layer 213 is disposed on the first transparent substrate 211, and the color filter layer 212 is disposed on the first transparent substrate 211 and on the black matrix layer 213. The black matrix layer 213 is made by opaque material, which includes metal (e.g. Cr, chromium oxide, or Cr—O—N compound) or resin for example. Since the black matrix layer 213 is opaque, a corresponding opaque area can be formed on the first substrate 21 so as to define a transparent area. The black matrix layer 213 includes a plurality of light-blocking segments Z, and at least one light-blocking segment Z is disposed between the two adjacent filter portions of the color filter layer (e.g. between the filter portions 212a and 212b, between the filter portions 212b and 212c, . . . ). In this embodiment, the first substrate 21 is a CF substrate while the second substrate 22 is a TFT substrate, for example. In other embodiments, however, the black matrix layer 213 can be disposed on the TFT substrate and the second substrate 22 thus becomes a BOA (BM on array) substrate, or the color filter layer 212 can be disposed on the TFT substrate and the second substrate 22 thus becomes a COA (color filter on array) substrate. To be noted, the above-mentioned structure of the substrate is just for example but not for limiting the scope of the invention. Moreover, the first substrate 21 can further include a protection layer (not shown), which can cover the color filter layer 212. The protection layer can include photoresist material, resin material or inorganic material (e.g. SiOx/SiNx), and protect the color filter layer 212 from being damaged during the subsequent processes.

The second substrate 22 includes a second transparent substrate 221, a plurality of TFT devices (not shown in FIG. 2C) and a plurality of pixel electrodes 222. The TFT devices and the pixel electrodes 222 are disposed on the side of the second transparent substrate 221 facing the first substrate 21. The pixel electrodes 222 can include a first pixel electrode 222a, a second pixel electrode 222b and a third pixel electrode 222c. By taking the second pixel electrode 222b as an example as shown in FIG. 2C, in a side view of the first substrate 21 perpendicular to the first side S1, the second pixel electrode 222b has a pixel width D, and the shortest offset distance d is formed between the center line of the light-blocking segment Z that is the closest to the second pixel electrode 222b and an edge of the second pixel electrode 222b. The offset distance d is 0~0.5 times the pixel width D. The offset distance farther from the center of the first substrate 21 is greater than the offset distance nearer the center of the first substrate 21. In other words, as shown in FIG. 2A, the offset distances on the two sides are greater than the offset distance near the center of the display panel P2.

As shown in FIGS. 2A and 2B, the first substrate 21 can further include a curved second side S2 opposite to the first side S1. Herein for example, the curvature radius of the second side S2 is equal to that of the first side S1. Moreover, the first substrate 21 can further include a third side S3, which is disposed adjacent to the first side S1 and the second side S2. The third side S3 may be not curved so as to have an infinite curvature radius, or may be a curved side with the curvature radius which is less than the infinity and greater than or equal to the curvature radius of the first side S1. Herein, the third side S3 (and the fourth side S4 opposite to the third side S3) is not curved as an example.

Figure 2F:
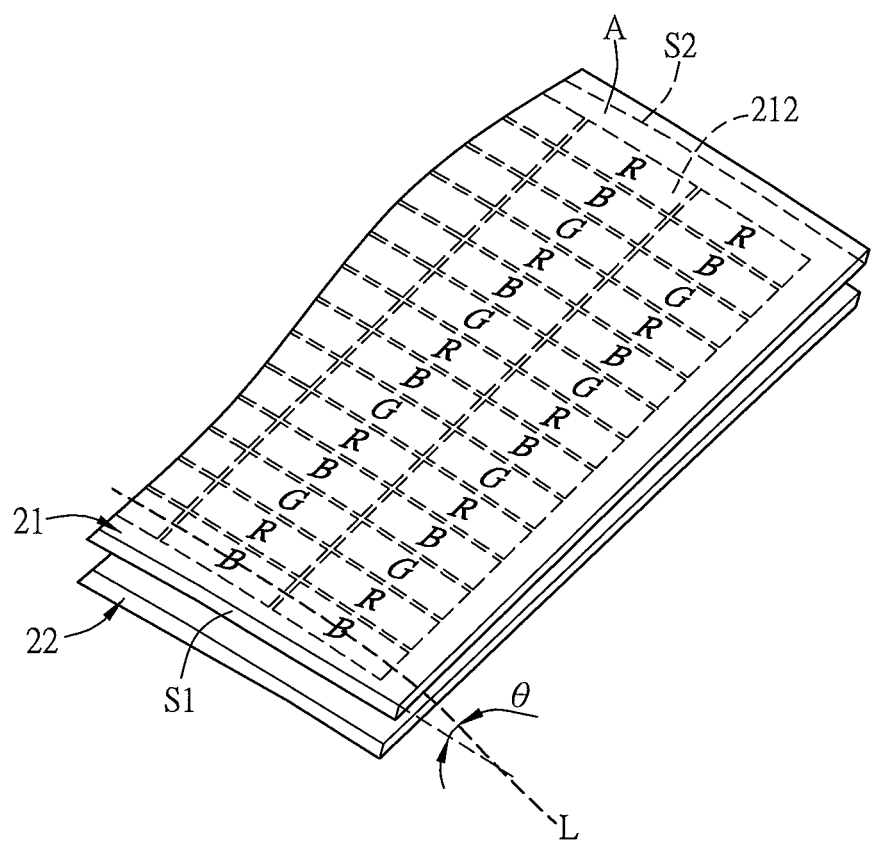
FIG. 2F is a schematic diagram showing the included angle between the datum line and the extension line of the first side according to an embodiment of the invention.

As shown in FIGS. 2A and 2B, in a projection direction (i.e. the top view of the display surface A) of the display apparatus 2 (display panel P2), the datum line L and the extension line of the first side Si have an included angle θ between 0° and 10° (zero degree indicates the datum line L is parallel to the extension line of the first side S1). The included angle θ can be shown in FIG. 2F or can be defined by taking a little segment of the datum line L within the display surface A of the display panel P2. Favorably, the included angle θ is between 0° and 5°. Moreover, the filter portions within the display area AA and under the datum line L have the same color (e.g. the green color filter portions G as shown in FIG. 2B). In other words, as shown in FIGS. 2A and 2B, the left and right sides of the display panel P2 are curved towards the opposite side of the display surface A (i.e. the back side of the display surface A), the datum line L crosses from the left side of the display surface A to the right side of the display surface A, and the included angle θ between the datum L and the extension line of the first side S1 is between 0° and 10° in a top view of the display surface A. Besides, the filter portions within the display area AA and under the datum line L have the same color (e.g. the color filter portions 212a, 212b, 212c under the datum line L as shown in FIGS. 2A to 2C are all the green color filter portions G).

As an embodiment, among the filter portions in an array, the filter portions of the same row parallel to the curved first side S1 have the same color. Accordingly, in a side view of the first substrate 21 perpendicular to the first side S1 as FIG. 2C, each of the pixel electrode just corresponds to the filter portions of the same color (e.g. the filter portions 212a and 212b corresponding to the first pixel electrode 222a are both green color (G), the filter portions 212b and 212c corresponding to the second pixel electrode 222b are both green color (G), . . . ). The filter portions of the same color are arranged substantially in parallel to the curved side (the the first side S1) of the first substrate 21, so when the backlight module emits the light passing through the pixel, the display apparatus 2 won't undergo the color mix problem and color distortion and can be thus provided with a better display quality.

When the display apparatus 2 is an OLED display apparatus as an embodiment, the second substrate of the OLED display panel can include a transparent substrate, a plurality of TFT devices and a plurality of organic light-emitting devices, and the TFT devices and the organic light-emitting devices are disposed on the transparent substrate. The first substrate of the OLED display apparatus can include the said filter portions. When the organic light-emitting devices of the second substrate are controlled to emit white light passing through the filter portions of the first substrate, the pixels of the OLED display panel can display colors forming images. Likewise, because the filter portions of the same color are arranged in parallel to the main curved side (e.g. the first side) of the OLED display panel, the OLED display apparatus won't undergo the color mix problem and can be thus provided with a better display quality.

Summarily, in the display apparatus of the invention, the first substrate includes a curved first side and a display area, the first side has at least a curvature radius between 500 mm and 10000 mm, and a datum line is defined in the display area. Besides, the color filter layer is disposed on the first substrate and includes a plurality of filter portions disposed within the display area. The datum line and the first side have an included angle between 0° and 10°, and the filter portions located on the datum line have the same color. Thereby, the filter portions of the same color are arranged substantially in parallel to the curved first side of the first substrate, so when the light passes through the pixel, the display apparatus won't undergo the color mix problem and color distortion and can be thus provided with a better display quality.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A display apparatus, comprising:
   a first substrate including a curved first side and a display area, wherein the first side has at least a curvature radius and the range of the curvature radius is between 500 mm and 10000 mm, at least one datum line is defined in the display area, and the datum line and the first side have an included angle between 0° and 10°;
   a second substrate disposed opposite to the first substrate and including a plurality of thin-film transistor (TFT) devices and a plurality of pixel electrodes; and
   a color filter layer disposed on the first substrate and including a plurality of filter portions disposed within the display area;
   wherein the filter portions located corresponding to the datum line have the same color,
   wherein the first substrate further includes a black matrix layer including a plurality of light-blocking segments, and at least one of the light-blocking segments is disposed between the two adjacent filter portions,
   wherein the pixel electrodes include a first pixel electrode having a pixel width, a shortest offset distance is formed between the center line of the light-blocking segment that is the closest to the first pixel electrode and an edge of the first pixel electrode, and the offset distance is 0~0.5 times the pixel width.

2. The display apparatus as recited in claim 1, wherein the offset distance farther from the center of the first substrate is greater than the offset distance nearer the center of the first substrate.

3. The display apparatus as recited in claim 1, wherein the curvature radius is further between 2000 mm and 7500 mm.

4. The display apparatus as recited in claim 1, wherein the included angle is further between 0° and 5°.

5. The display apparatus as recited in claim 1, further comprising:
   a liquid crystal layer disposed between the first substrate and the second substrate.

6. The display apparatus as recited in claim 1, wherein the first substrate further includes a third side, which is disposed adjacent to the first side and has a curvature radius less than the infinity and greater than or equal to the curvature radius of the first side.

* * * * *